United States Patent
Heiska et al.

(10) Patent No.: US 10,966,153 B2
(45) Date of Patent: Mar. 30, 2021

(54) USER NODE, NETWORK NODE AND METHODS FOR ALLOCATING AND USING RESOURCES FOR CONTROL SIGNALS

(71) Applicant: Huawei Technologies Co., Ltd., Shenzhen (CN)

(72) Inventors: Kari Heiska, Kista (SE); Kari Juhani Leppanen, Kista (SE); Pauli Seppinen, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/570,661

(22) Filed: Sep. 13, 2019

(65) Prior Publication Data
US 2020/0008151 A1 Jan. 2, 2020

Related U.S. Application Data

(63) Continuation of application No. PCT/EP2017/056005, filed on Mar. 14, 2017.

(51) Int. Cl.
*H04W 52/02* (2009.01)
*H04W 76/28* (2018.01)
(Continued)

(52) U.S. Cl.
CPC ... *H04W 52/0235* (2013.01); *H04W 52/0229* (2013.01); *H04W 52/146* (2013.01); *H04W 76/28* (2018.02); *H04W 88/023* (2013.01)

(58) Field of Classification Search
CPC ............. H04W 52/0235; H04W 76/28; H04W 52/0229; H04W 52/146; H04W 88/023; H04W 52/028; Y02D 30/70
See application file for complete search history.

(56) References Cited

U.S. PATENT DOCUMENTS 9,191,890 B2  11/2015  Jafarian et al.
9,191,891 B2  11/2015  Jafarian et al.
(Continued)

FOREIGN PATENT DOCUMENTS

CN  102415201 A   4/2012
CN  105191432 A  12/2015
(Continued)

OTHER PUBLICATIONS

"WF on evaluation for wake-up signal," 3GPP TSG-RAN WG1 #87, Reno, Nevada, USA, R1-1612069, pp. 1-3, 3rd Generation Partnership Project, Valbonne, France (Nov. 14-18, 2016).
"Wake-Up Schemes for DRX in NR," 3GPP TSG-RAN WG2 Meeting #96, Reno, US, R2-168612, pp. 1-4, 3rd Generation Partnership Project, Valbonne, France (Nov. 14-18, 2016).
(Continued)

*Primary Examiner* — Afshawn M Towfighi
(74) *Attorney, Agent, or Firm* — Leydig, Voit & Mayer, Ltd.

(57) ABSTRACT

A user node comprises a first modem capable of receiving a full set of resource elements and a secondary transceiver modem capable of receiving a subset of resource elements among the full set of resource elements, the subset of resource elements comprising resource element blocks. The first transceiver modem is configured to receive first control information identifying the subset of the resource elements and second control information enabling determination of a currently used resource element block among the subset of resource elements, send the first control information and the second control information to the secondary transceiver modem and enter into a reduced power state. The secondary transceiver modem is configured to receive at least one signal in the subset of resource elements while the first transceiver modem is in the reduced power state, determine a control decision and output at least one command.

20 Claims, 10 Drawing Sheets

(51) Int. Cl.
  *H04W 52/14* (2009.01)
  *H04W 88/02* (2009.01)

(56) References Cited

U.S. PATENT DOCUMENTS

| | | | |
|---|---|---|---|
| 10,827,321 B2 * | 11/2020 | Liu | H04W 72/042 |
| 2010/0099358 A1 | 4/2010 | Kumar et al. | |
| 2010/0322126 A1 * | 12/2010 | Krishnaswamy | H04W 48/16 370/311 |
| 2016/0128128 A1 * | 5/2016 | Ang | H04W 52/0235 370/311 |
| 2016/0373237 A1 * | 12/2016 | Shellhammer | H04L 27/2675 |

FOREIGN PATENT DOCUMENTS

| | | |
|---|---|---|
| CN | 106160839 A | 11/2016 |
| JP | 2018521574 A | 8/2018 |
| WO | 2016033598 A1 | 3/2016 |

OTHER PUBLICATIONS

Bryant et al., "A 2.45GHz, 50uW Wake-up Receiver Front-end with-88dBm Sensitivity and 250kbps Data Rate," pp. 235-238, IEEE, Institute of Electrical and Electronics Engineers, New York, New York (2014).

Mazloum et al., "Performance Analysis and Energy Optimization of Wake-Up Receiver Schemes for Wireless Low-Power Applications," IEEE Transactions on Wireless Communications, vol. 13, No. 12, pp. 7050-7061, Institute of Electrical and Electronics Engineers, New York, New York (Dec. 2014).

Pletcher et al., "Ultra-Low Power Wake-Up Receivers for Wireless Sensor Networks," Technical Report No. UCBI/EECS-2008-59, pp. 1-164, Electrical Engineering and Computer Sciences University of California at Berkeley (May 20, 2008).

Park et al., "Status of Project IEEE 802.11ba, Wake-up Radio (WUR) Operation," IEEE P802.11-Task Group BA-Group Information, pp. 1-8, Institute of Electrical and Electronics Engineers, New York, New York (Dec. 16, 2019). Retrieved from the Internet: http://www.ieee802.org/11/Reports/tgba_update.htm.

JP/2019-550706, Notice of Reasons for Rejection, dated Oct. 26, 2020.

* cited by examiner

USER NODE, NETWORK NODE AND METHODS FOR ALLOCATING AND USING RESOURCES FOR CONTROL SIGNALS

CROSS-REFERENCE TO RELATED APPLICATIONS

This application is a continuation of International Application No. PCT/EP2017/056005, filed on Mar. 14, 2017, the disclosure of which is hereby incorporated by reference in its entirety.

TECHNICAL FIELD

The present application relates to the field of wireless communications, and more particularly to a user node, a network node and methods for allocating and using resources for control signals.

BACKGROUND

In mobile communication networks, if user nodes are continuously connected to a network, the power consumption of the user terminals is excessive. In order to reduce power consumption, a user terminal may save energy by switching its transceiver off during the time when there is no data to be transmitted or received. One possible power saving solution uses discontinuous reception (DRX).

For example, in the Long-Term Evolution (LTE) there are two UE stages: RRC_IDLE and RRC_CONNECTED and the DRX functionality can be configured for both of these stages. In the LTE idle mode DRX a user node can wake up to periodically read the paging channel in order to determine whether it has pending downlink traffic. In the LTE connected mode DRX the user node is scheduled periodically and the user node knows when to be active and when to sleep based on the scheduling grants and the DRX parameters.

In current mobile communication networks, existing power saving solutions lack power efficiency, especially with low-latency traffic or for infrequent sporadic traffic. In mobile communication networks, it will be essential to serve users with latencies on the order of 5-10 ms, for example, for gaming or augmented reality services, at the same time pushing the power consumption of the user node receiver down. Normally this would mean that the UE receiver checks the paging channel at such time intervals. However, this significantly increases the power consumption.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an object of the invention to provide a solution for reducing power consumption and latency at a user node of a mobile communication network. The foregoing and other objects are achieved by the features of the independent claims. Further implementation forms are apparent from the dependent claims, the description and the figures.

According to a first aspect a user node is provided. The user node comprises a first transceiver modem capable of receiving a full set of resource elements and a secondary transceiver modem capable of receiving a subset of resource elements among the full set of resource elements, the subset of resource elements comprising resource element blocks. The first transceiver modem is configured to receive first control information identifying the subset of the resource elements and second control information enabling determination of a currently used resource element block among the subset of resource elements, send the first control information and the second control information to the secondary transceiver modem and enter into a reduced power state. The secondary transceiver modem is configured to receive, based on the first control information and the second control information, at least one signal in the subset of resource elements while the first transceiver modem is in the reduced power state, determine a control decision based on the at least one signal, and output at least one command associated with the control decision. By using the secondary transceiver modem to receive and process signals in the subset of resource elements while the first transceiver modem is in the reduced power state, power consumption is reduced, and at the same time, also latency is reduced.

In a first possible implementation of the user node according to the first aspect, the at least one command comprises a wake-up command, wherein the secondary transceiver modem is configured to send the wake-up command to the first transceiver modem to wake up the first transceiver modem from the reduced power state. By using the secondary transceiver modem as a wake-up modem, the first transceiver modem can remain in the reduced power state, and the wake-up modem can be used to switch the first transceiver modem back on. This enables reduced power consumption and reduced latency.

In a second possible implementation of the user node according to the first aspect as such or according to any of the preceding implementations of the first aspect, the secondary transceiver modem is configured to send a command to at least one of a radio frequency receiver, a front-end module, a radio frequency transmitter, or a radio frequency integrated circuit unit of the user node. By making control decisions with the secondary transceiver modem and controlling user node entities based on the control decision with the secondary transceiver modem, the first transceiver modem may remain in the reduced power state. This enables reduced power consumption and reduced latency.

In a third possible implementation of the user node according to the second implementation of the first aspect, the command comprises a command for the radio frequency receiver, wherein the secondary transceiver modem is configured to send the command to the radio frequency receiver to change a discontinuous reception cycle of the first transceiver modem. By making the control decision with the secondary transceiver modem and controlling the radio frequency receiver with the secondary transceiver modem, the first transceiver modem may remain in the reduced power state. This enables reduced power consumption and reduced latency.

In a fourth possible implementation of the user node according to any of the second and third implementation of the first aspect, the command comprises a power up/down command, wherein the secondary transceiver modem is configured to send the power up/down command to the front-end module to increase or decrease the transmission power. By making the control decision with the secondary transceiver modem and controlling the front-end module with the secondary transceiver modem, the first transceiver modem may remain in the reduced power state. This enables reduced power consumption and reduced latency.

In a fifth possible implementation of the user node according to any of the second, third and fourth implementation of the first aspect, the command comprises an uplink tracking signal command, wherein the secondary transceiver modem is configured to send the uplink tracking signal command to the radio frequency transmitter to cause the radio frequency transmitter to transmit an uplink tracking signal. By making the control decision with the secondary transceiver modem and controlling the radio frequency transmitter with the secondary transceiver modem, the first transceiver modem may remain in the reduced power state. This enables reduced power consumption and reduced latency.

In a sixth possible implementation of the user node according to any of the second, third, fourth and fifth implementation of the first aspect, the command comprises a feedback channel command, wherein the secondary transceiver modem is configured to send the feedback channel command to the radio frequency transmitter to cause the radio frequency transmitter to provide a feedback channel for a wake-up signal. By making the control decision with the secondary transceiver modem and controlling the radio frequency transmitter with the secondary transceiver modem, the first transceiver modem may remain in the reduced power state. This enables reduced power consumption and reduced latency.

In a seventh possible implementation of the user node according to any of the second, third, fourth, fifth and sixth implementation of the first aspect, the radio frequency integrated circuit unit comprises a mmWave receiver, wherein the secondary transceiver modem is configured to send the command to control the mmWave receiver. By making the control decision with the secondary transceiver modem and controlling the radio frequency integrated circuit unit with the secondary transceiver modem, the first transceiver modem may remain in the reduced power state. This enables reduced power consumption and reduced latency.

According to a second aspect a network node is provided. The network node comprises a processing unit configured to generate first control information identifying a subset of resource elements among a full set of resource elements, and generate second control information enabling determination of a currently used resource element block among the subset of resource elements. The network node further comprises a transceiver configured to transmit the first control information and the second control information to a first transceiver modem of a user node. The processing unit is configured to allocate at least one signal in the currently used resource element block among the subset of resource elements, and the transceiver is configured to transmit the at least one signal in the subset of resource elements to a secondary transceiver modem of the user node while the first transceiver modem is in a reduced power state. By enabling the secondary transceiver modem of the user node to receive signals in the subset of resource elements while the first transceiver modem is in the reduced power state and to and make a control decision based in the signals, power consumption of the user node is reduced, and at the same time, also latency is reduced.

In a first possible implementation of the network node according to the second aspect, the at least one signal is associated with a wake-up command to wake up the first transceiver modem from the reduced power state. By enabling the secondary transceiver modem to act as a wake-up modem, the first transceiver modem can remain in the reduced power state, and the wake-up modem can be used to switch the first transceiver modem back on. This enables reduced power consumption and reduced latency.

In a second possible implementation of the network node according to the second aspect as such or according to any of the preceding implementations of the second aspect, the at least one signal comprises a signal for at least one of a radio frequency receiver, a front-end module, a radio frequency transmitter, or a radio frequency integrated circuit unit of the user node to enable control of the signaled entity while the first transceiver modem is in the reduced power state. By sending the signals to the secondary transceiver modem and enabling making of control decisions with the secondary transceiver modem and enabling control of the user node entities with the secondary transceiver modem, the first transceiver modem may remain in the reduced power state. This enables reduced power consumption and reduced latency.

In a third possible implementation of the network node according to the second aspect as such or according to any of the preceding implementations of the second aspect, the processing unit is configured to allocate a common code sequence for a group of user nodes for the transmission of the at least one signal. This enables simultaneous control of a multiple user nodes.

In a fourth possible implementation of the network node according to the second aspect as such or according to any of the preceding implementations of the second aspect, the processing unit is configured to allocate the same time, frequency and code resources for resource element blocks in different antenna beams. This enables improved mobility of user nodes and saves network resources.

According to a third aspect a method is provided. The method comprises receiving, by a first transceiver modem, first control information identifying a subset of resource elements among a full set of the resource elements; receiving, by the first transceiver modem, second control information enabling determination of a currently used resource element block among the subset of resource elements; sending, by the first transceiver modem the first control information and the second control information to a secondary transceiver modem; entering into a reduced power state with the first transceiver modem; receiving, by the secondary transceiver modem, based on the first control information and the second control information, at least one signal in the subset of the resource element blocks while the first transceiver modem is in the reduced power state; determining, by the secondary transceiver modem, a control decision based on the at least one signal; and outputting, by the secondary transceiver modem, at least one command associated with the control decision. By using the secondary transceiver modem to receive and process signals in the subset of resource elements while the first transceiver modem is in the reduced power state and, power consumption is reduced, and at the same time, also latency is reduced.

According to a fourth aspect a method is provided. The method comprises generating, by a processing unit, first control information identifying a subset of resource elements among a full set of resource elements; generating, by the processing unit, second control information enabling determination of a currently used resource element block among the subset of resource elements; transmitting, by a transceiver, the first control information and the second control information to a first transceiver modem of a user node; allocating, by the processing unit, at least one signal in the currently used resource element block among the subset of resource elements; and transmitting, by the transceiver, the at least one signal in the subset of resource elements to a secondary transceiver modem of the user node while the first transceiver modem is in a reduced power state. By enabling the secondary transceiver modem of the user node to receive signals in the subset of resource elements while the first transceiver modem is in the reduced power state and to and make a control decision based in the signals, power consumption of the user node is reduced, and at the same time, also latency is reduced.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like references are used to designate like parts in the accompanying drawings.

DETAILED DESCRIPTION

The detailed description provided below in connection with the appended drawings is intended as a description of the embodiments and is not intended to represent the only forms in which the embodiment may be constructed or utilized. However, the same or equivalent functions and structures may be accomplished by different embodiments.

Fourth generation wireless communication networks use orthogonal frequency division multiple access (OFDMA) based multiple access to enable access by multiple users over a given fixed spectrum. In OFDMA, the given spectrum may be divided into multiple subcarriers which are allotted to user nodes or to user equipment (UE) over time. Further, although some embodiments may be described in terms of OFDMA, the disclosed solution may be applicable also to other already existing or future radio access techniques.

Further, although aspects and embodiments may be described in terms of a user node, it is by way of example and in no way a limitation. A user node, such as a user equipment (UE), may include various types of devices used directly by an end user and capable of communication in a cellular network.

Further, although aspects and embodiments may be described in terms of a network node or a base station, it is by way of example and in no way a limitation. A network node may include a NodeB, an evolved NodeB or any other device at the edge of a cellular network providing an air interface for user nodes to connect to the cellular network.

Figure 1A:
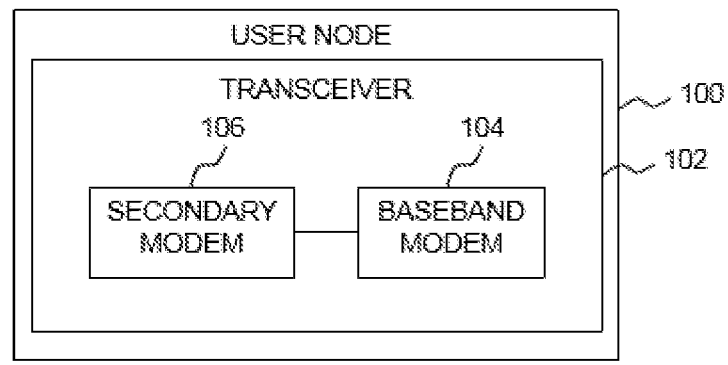
FIG. 1A illustrates a schematic representation of a user node having two transceiver modems.

FIG. 1A illustrates a schematic representation of a user node having two transceiver modems. In an aspect, the user node 100 comprises a first transceiver modem 104 capable of receiving a full set of resource elements. The first transceiver modem 104 is, for example, a baseband modem of the user node 100. The user node 100 also comprises a secondary transceiver modem 106 capable of receiving a subset of resource elements among the full set of resource elements, the subset of resource elements comprising resource element blocks.

The first transceiver modem 104 is configured to receive first control information identifying the subset of the resource elements and second control information enabling determination of a currently used resource element block among the subset of resource elements. The first control information may comprise a first control signal including a control message informing the secondary transceiver modem 106 the resource blocks it is able to receive. The second control information may comprise a control message informing currently used resource block or a method for calculating currently used resource block. For example, the second control information may inform some kind of mapping between the information that the user node 100 may already have and the used resource block.

The first transceiver modem 104 is configured to send the first control information and the second control information to the secondary transceiver modem 106. The first control information informs the secondary transceiver modem 106 about the inner structure of an incoming signal it is later about to receive. The first control information can be used by the secondary transceiver modem 106 to find out the resource element structure (i.e., the subset of resource elements and under that the blocks of resource elements).

At some point after sending the first control information and the second control information to the secondary transceiver modem 106, the first transceiver modem 104 is configured to enter into a reduced power state. The reduced power state may be entered, for example, after a network node has sent a positive admission reply with granted resources for the secondary transceiver modem 106 and the user node starts to read the subset of resource elements with the secondary transceiver modem 106. The term "reduced power state" refers to a state in which the power consumed by the first transceiver modem 104 is less than in a normal operation state. In an embodiment, the reduced power state may refer to sleep state of the first transceiver modem. There can be several modes or variations of sleep or reduced power state for the first transceiver modem 104, each mode corresponding to a different wake-up time and different sleep mode power consumption. The deeper the sleep mode, the lower is the power consumption but also the longer is the wake-up time, correspondingly. The term "reduced power state" is intended to cover all modes of sleep during which the first transceiver modem 104 is not able to decode and utilize received radio frequency signals.

The secondary transceiver modem 106 is configured to receive, based on the first control information and the second control information, at least one signal in the subset of resource elements while the first transceiver modem 104 is in the reduced power state. The secondary transceiver modem 106 determines a control decision based on the at least one signal and outputs at least one command associated with the control decision.

In an embodiment, a command is output in response to a signal in the subset of resource elements. In another embodiment, more than one command is output in response to a signal in the subset of resource elements. In another embodiment, more than one command is output in response to multiple signals in the subset of resource elements. In another embodiment, a command is output in response to multiple signals in the subset of resource elements.

Although FIG. 1A discloses that a single transceiver 102 comprises both the first transceiver modem 104 and the secondary transceiver modem 106, in another example, first transceiver modem 104 may be arranged into a first transceiver and the secondary transceiver modem 106 may be arranged into a second transceiver.

Figure 1B:
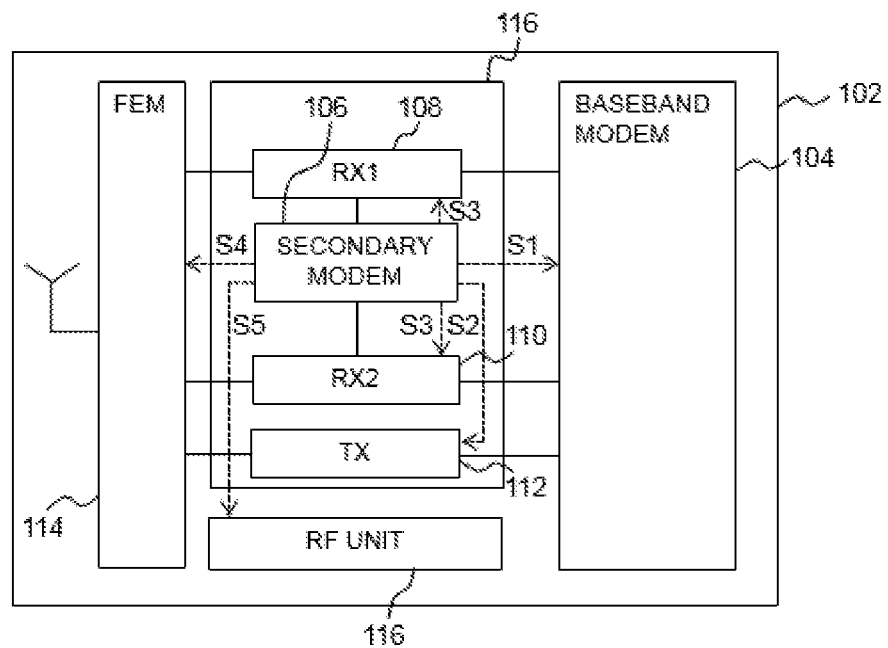
FIG. 1B illustrates a more detailed representation of a transceiver of a user node.

FIG. 1B illustrates a more detailed representation of the transceiver 102 of the user node 100. The transceiver 102 comprises the first transceiver modem 104 (for example, the baseband modem of the user node), the secondary transceiver modem 106, two radio frequency receivers 108, 110, a radio frequency transmitter 112, a front-end-module 114 and a radio frequency integration circuit unit 116. In an embodiment, a command output by the secondary transceiver modem 106 is provided as a control command to any of the above listed elements.

In an embodiment, the secondary transceiver modem 106 is configured to send a wake-up command S1 to the first transceiver modem 106 to wake up the first transceiver modem 104 from the reduced power state. This enables a solution where power consumption and latency are reduced.

In an embodiment, the secondary transceiver modem 106 is configured to send a command S2 to the radio frequency transmitter 112 to control the operation of the radio frequency transmitter 112. The command S2 may be an uplink tracking signal command to cause the radio frequency transmitter 112 to transmit an uplink tracking signal. The secondary modem can be utilized for energy efficient mobility in the uplink direction. In the uplink direction, the uplink tracking signals can be sent from the secondary transceiver modem without switching on the first transceiver modem. This enables a solution where power consumption and latency are reduced.

The power control for the uplink tracking signals can be implemented through downlink secondary modem control signals. The downlink beam selection in the case of many beams is power consuming requiring many consequential measurements. In the downlink the mobility with the secondary transceiver modem can be implemented with downlink reference signals which can be sent over the block of downlink control elements. Reference signals received simultaneously from various network nodes or beams is compared and the mobility decision may be carried out by the secondary transceiver modem. The mobility decision may be, for example, an initial decision which triggers the first transceiver modem to be switched on for the accurate measurements or a final decision where the whole decision will be done by the secondary transceiver modem. In the latter case, the secondary transceiver modem may send a beam-switch command to the network node.

In an embodiment, the command S2 may be a feedback channel command to cause the radio frequency transmitter 112 to provide a feedback channel for a wake-up signal. This enables a solution where power consumption and latency are reduced.

In an embodiment, the secondary transceiver modem 106 is configured to send a command S3 to the radio frequency receiver 108, 110 to control the operation of the radio frequency transmitter receiver 108, 110. The command S3 may be a command to change a discontinuous reception cycle of the first transceiver modem 104.

In an embodiment, the secondary transceiver modem 106 is configured to send a command S4 to the front-end module 114 to control the operation of the front-end module 114. The command S4 may be a power up/down command to increase or decrease the transmission power. In the closed loop power control the network node may measure the uplink tracking signal and send a power control command to the user node by using the dedicated power control resource block. The secondary transceiver may be configured to read a dedicated power control resource block and decide a power up/down command to be sent to a power amplified typically located in the front-end module 114. In another embodiment, the secondary transceiver modem 106 may be configured to measure the reference signal power and if the transmitting power of the network node is known based on the measurements, the user node 100 is able to estimate the pathloss and needed transmission power.

In an embodiment, the secondary transceiver modem 106 is configured to send a command S5 to the radio frequency integration circuit unit 116 to control the operation of the radio frequency integration circuit unit 116. The radio frequency integration circuit unit 116 may be, for example, a mmWave receiver. The second transceiver modem 106 may control radio frequency integrated circuit (RF-IC) units which are responsible on different bands. For example, second transceiver modem 106 may send a control information including an activation command for another RF-IC which can be a modem responsible on another operation band like millimeter (mmWave) band. The activation command can initiate mmWave band radio frequency reception in addition to waking up the first transceiver modem 104.

In an embodiment, the secondary transceiver modem 106 can be utilized for reading a synchronization signal. The synchronization signal is a known complex valued signal sequence with good auto-correlation properties (for example, Zadoff-Chu sequences in the Long-Term Evolution (LTE). In order to keep the user node 100 synchronized the synchronization signal need to be read periodically. Since the user node knows the coarse timing of the synchronization signal, the overall reading time and the overall active time of the modem due to synchronization can be relatively low.

Figure 2:
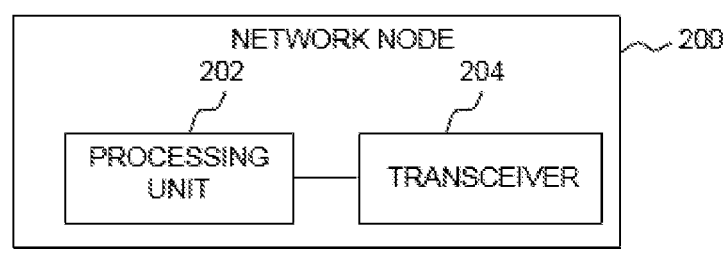
FIG. 2 illustrates a schematic representation of a network node.

FIG. 2 illustrates a schematic representation of a network node 200. The network node 200 may be a Node B of an existing or future generation radio access network technology. The network node 200 comprises a processing unit 202 configured to generate first control information identifying a subset of resource elements among a full set of resource elements and to generate second control information enabling determination of a currently used resource element block among the subset of resource elements. The network node 200 further comprises a transceiver 204 configured to transmit the first control information and the second control information to the first transceiver modem 104 of the user node 100.

The processing unit 202 is also configured to allocate a signal in the currently used resource element block among the subset of resource elements, and the transceiver 204 is configured to transmit the signal in the subset of resource elements to a secondary transceiver modem 106 of the user node 100 while the first transceiver modem 104 is in a reduced power state. Based on the signal, the secondary transceiver modem 106 in the user node is able to make a control decision without waking up the first transceiver modem 104.

In an embodiment, the signal is associated with a wake-up command to wake up the first transceiver modem 104 from the reduced power state. This enables a solution where power consumption and latency are reduced.

In an embodiment, the signal comprises a signal for the radio frequency receiver 108, 110, the front-end module 114, the radio frequency transmitter 112, or the radio frequency integrated circuit unit 116 of the user node 100. This provides a solution where the network node 200 is able to initiate control of the signaled entity while the first transceiver modem 104 of the user node 100 is in the reduced power state. This enables a solution where power consumption and latency are reduced.

In an embodiment, the processing unit 202 is configured to allocate a common code sequence for a group of user nodes 100 for the transmission of the signal. This is especially beneficial if several user nodes (for example, Internet of Things (IoT) devices) are receiving the downlink signal simultaneously. Also the multi-user scheduling or multicast service can utilize the grouping of user nodes. All the user nodes belonging to a multi-user scheduling group or multicast group consists also a wake-up group.

In an embodiment, the processing unit 202 is configured to allocate the same time, frequency and code resources for resource element blocks in different antenna beams. As the same time, frequency and code resources are allocated for resource element blocks in different antenna beams control resources area saved. As the nodes moves through the antenna beams, the same resources may be used in different antenna beams in order to avoid reconfiguration. Further, in order to avoid reconfiguration some part of the code resources can be allocated for user nodes with a higher mobility. This can be detected, for example, through channel quality information or from a beam/network node change history.

Figure 3A:
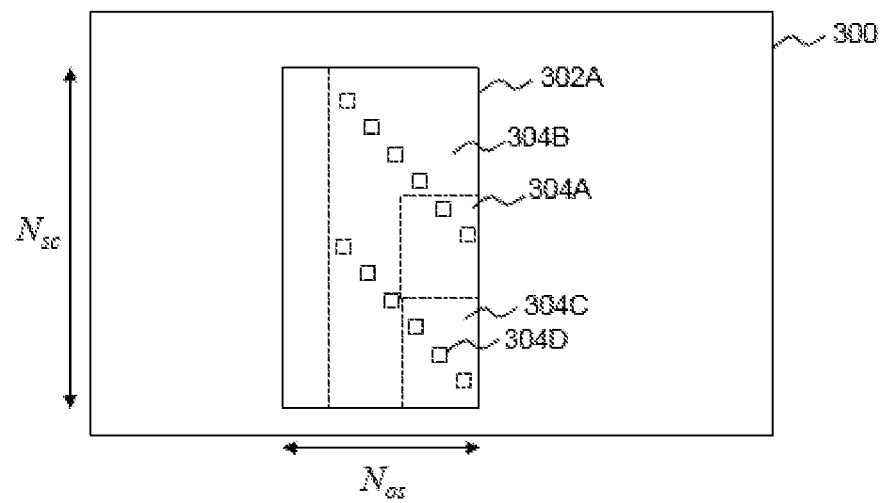
FIG. 3A illustrates a frame structure supporting secondary transceiver modem reception.

FIG. 3A illustrates a frame structure supporting secondary transceiver modem reception. FIG. 3A discloses an example orthogonal frequency-division multiple access (OFDMA) frame structure to be used between the network node 200 and the user node 100. A block 300 refers to a full set of resource elements that can be used between the network node 200 and the user node 100. The secondary transceiver modem 106 is able to receive a subset 302A of resource elements from the full set of resource elements 300. The subset 302A may comprise blocks of resource elements 304A, 304B, 304C, 304D. The blocks of resource elements 304A, 304B, 304C, 304D may contain a control signal (CS), a reference signal (RS) or a data signal (DS). The control signal can be used for controlling different transceiver functionalities. The reference signal can be used for reference measurements. The data signal can be used for higher level downlink control for low latency and low power consumption applications. In other words, the data signal can be used, for example, for industrial applications where the higher level control can be embedded into a direct PHY message enabling low latency and low power consumption.

The signal allocated by the network node 200 can be realized, for example, with a code signature modulated inside the OFDMA frame structure. Each user node 100 may have its own orthogonal coding waveform (using e.g. Walsh or Zadoff-Chu Sequences) which can be detected. Thus, the code division multiple access (CDMA) modulated signal can be transmitted inside the subset 302A inside the frame. The size of the subset 302A is $N_{sc}$ subcarriers time $N_{os}$ OFDMA symbols.

Figure 3B:
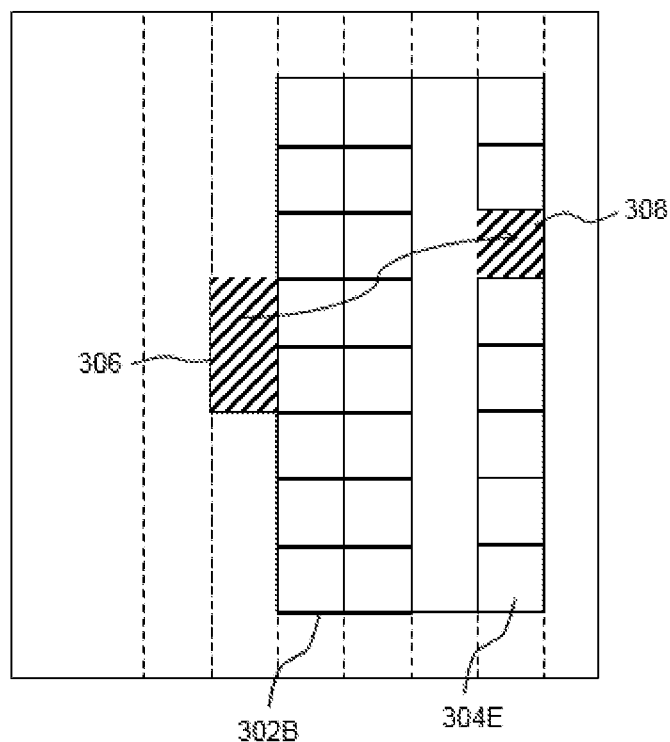
FIG. 3B illustrates a frame structure comprising a mobility block.

FIG. 3B illustrates a frame structure comprising a mobility block 306. In this example, a subset 302B of resource elements includes additionally a special type of block 306 having a code word referring to a block of resource elements in the subset 302B. In this example, the special type of block 306 is called as a mobility block. The mobility block 306 may include $n_m = 1 \cdot n$ symbols, where l is the length of a known mobility code and n is the length of the code word. Each block 304E of resource elements has a unique index number. With n length code word it is possible to refer to $2^n$ different block indexes.

The mobility code may be the same for all user nodes in a mobile communication system enabling access to the subset resources independent on the location of the user nodes. A user node can read the mobility block 306 by using the secondary modem and based on the content of the mobility block 306 find the location of a right resource element block 308. Relating to the subset 302B, the network node 200 transmits only the mobility block 306 and the referred resource element block 308 and all the other resource elements can be used for other purposes. The use of the mobility block 306 enables improving the performance with the mobility of the user node 100.

Figure 4:
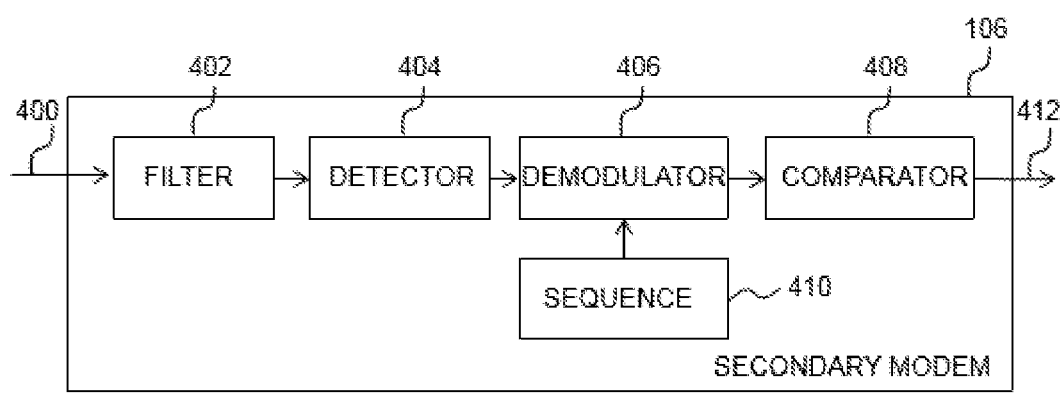
FIG. 4 illustrates a schematic representation of a secondary transceiver modem.

FIG. 4 illustrates a schematic representation of the secondary transceiver modem 106. The secondary transceiver modem 106 comprises a filter 402 receiving an incoming signal 400. The filter 402, either a digital or an analog filter, generates a narrowband signal for further processing. The filtered signal is input to a detector 404, for example, to an OFDMA detector which further separates different subcarrier components from the signal resulting sequence symbols for each subcarrier and for each received OFDM symbol. A demodulator 406, for example, a CDMA demodulator generates the output signal by correlating the received sequence with a known user node key sequence 410. A comparator 408 makes a decision 412 concerning the input signal 400 by comparing the demodulator output with a known decision threshold. The decision 412 is, for example, a wake-up command to be sent to the first transceiver modem 104.

Figure 5A:
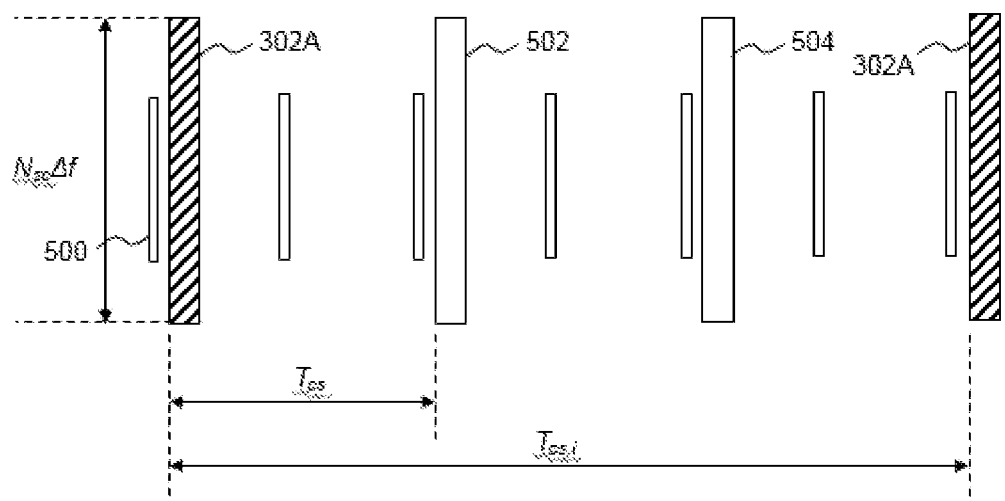
FIG. 5A illustrates control resources dedicated to a user node.

FIG. 5A illustrates control resources dedicated to a user node. A main synchronization signal 500 recurs at a set time interval and it keeps the user node synchronized. In this example, a subset 302A of resource elements has been dedicated to the user node. Other subsets 502, 504 may be dedicated and used by other user nodes. $T_{cs}$ denotes a subset period and $T_{cs,i}$ denotes a subset period for a user node i. $N_{os}N_{sc}\Delta f$ denotes the size of the subset 302A. The overall capacity of the control signal can be increased by allocating longer sub-set periods for the user node i ($T_{cs,i}$) at the cost of additional latency. The term "capacity" here refers to the number of user nodes which can utilize the control signal over the same time period while the control signal is still separable. Increasing the period of listening to the control signal also decreases the power consumption of the user node.

Figure 5B:
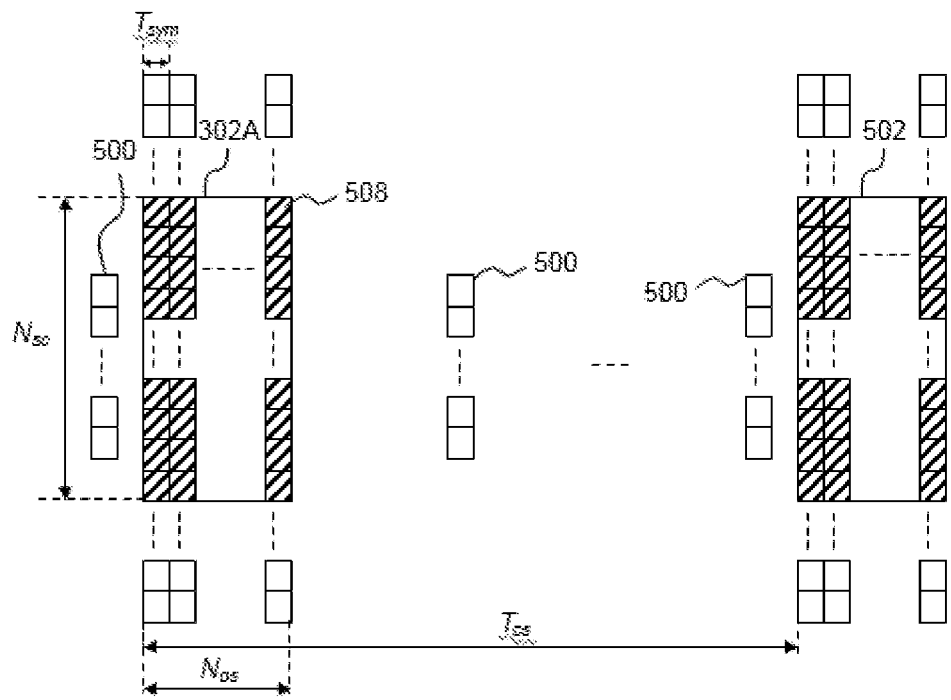
FIG. 5B illustrates a subset of resource elements in an OFDMA frame structure.

FIG. 5B illustrates a subset of resource elements in an OFDMA frame structure. FIG. 5B illustrates the same control resource as was illustrated in FIG. 5A but in a more detailed manner.

A group of subsets 302A, 502 consists of user nodes in a cell having an access to control resources. Each user node belonging to a subset group may have been allocated a code (for example, $i^{th}$ user terminal of the group having code $c_i(n)$. The code $c_i(n)$ is a complex valued sequence with length $N_{cs}$ orthogonal with sequences of other user terminals in the group, i.e. $ci(n)^T \cdot cj(n)=0$ when $i \neq j$. Possible sequences are, for example, Walsh-code or Zadoff-Chu sequence. There can be different number of resource blocks inside one subset depending on the need including fixed or time-wise varying allocations per subset. For example, one subset can be allocated to wake-up signaling and power control signaling with fixed allocations or a wake-up signal takes the whole resource but when power control signaling is transmitted the amount of wake-up signaling resources is decreased.

The subset 302A of resource elements comprises a set of resource element blocks 508. The size of the subset 302A is $N_{sc}$ subcarriers times $N_{os}$ OFDMA symbols. The length of each OFDMA symbol is $T_{sym}$. The total number of symbols per subset is $N_{cs}=N_{sc} \cdot N_{os}$. The distance between two consecutive subsets 302A and 502 is $T_{cs}$. The subsets 302A, 502 can be in fixed location relative to the resources reserved for synchronization in order to reduce the signaling. The allocation of the subsets 302A, 502 and the number corresponding symbols can be considered to be fixed. The utilization of these resources by an individual user node varies and can be controlled by a special admission control.

The shorter the subset block ($N_{os}T_{sym}$) relative to the subset period ($T_{cs}$) the lower is the duty cycle and the lower is the power consumption of the secondary transceiver modem 106.

Figure 6:
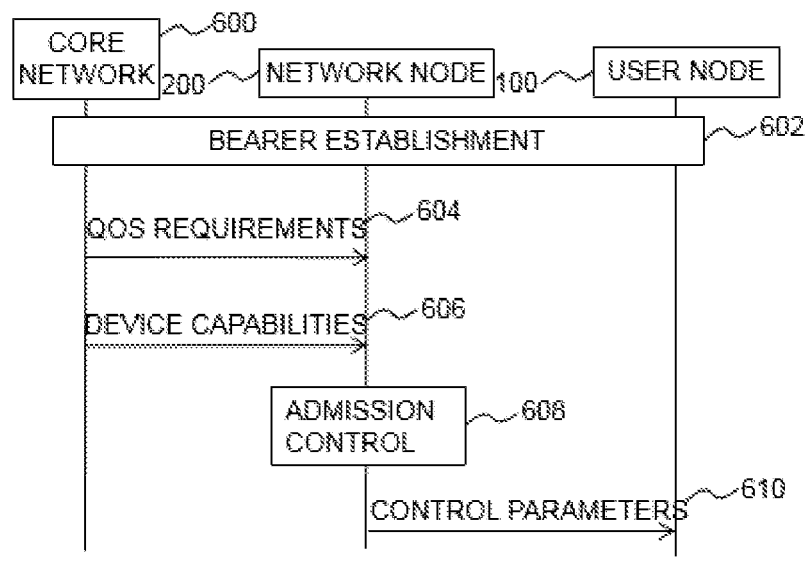
FIG. 6 illustrates admission control for control resources of a secondary transceiver modem.

FIG. 6 illustrates admission control for control resources of the secondary transceiver modem 106.

During a bearer establishment procedure a core network 600 and a network node 200 negotiate the treatment and parameters relating to traffic flows. The core network 600 sends QoS parameters 604 relating to traffic flow to the network node. If a service requires functionalities related to the secondary transceiver modem 106 (for example, wake-up, power control etc.), the core network 600 sends also device capabilities 606 supporting the functionalities to the network node 200. The network node 200, for example, a NodeB, executes an admission control 608 procedure to define the default control parameters for the control signals (CS), reference signals (RS) or data signals (DS) to fulfill the QoS requirements, estimate the load, modify the control parameters and finally accept or reject the control service request.

If accepted, the network node 200 sends the control parameters 610 to the user node 100. The control parameters 610 may comprise, for example, the DRX cycle for mobile i ($T_{cs,i}$), the size of the control block ($N_{sc}$, $N_{os}$) and frequency and time offsets for successive control blocks ($\Delta f_{wu}, \Delta t_{wu}$).

In an embodiment, the network node 200 may allocate the same time/frequency/code resources for the control signal of user nodes in different beams saving the control resources. As the user node 100 moves through the beams, the same resources can be used in different beams in order to avoid reconfiguration.

Figure 7A:
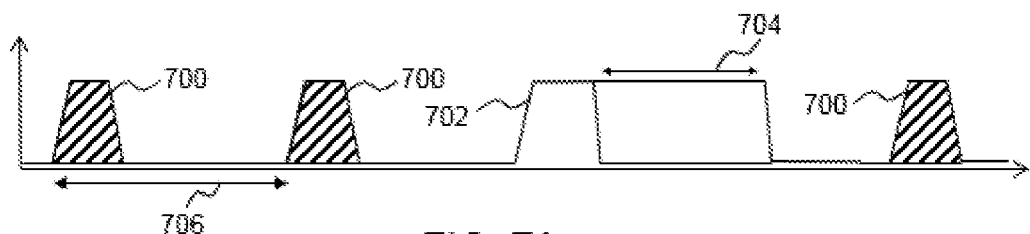
FIG. 7A illustrates discontinuous reception operation.
Figure 7B:
FIG. 7B illustrates discontinuous wake-up receiver operation.

FIG. 7A illustrates discontinuous reception (DRX) operation and FIG. 7B illustrates discontinuous wake-up receiver (D-WuRx) operation. In the example illustrated in FIGS. 7A and 7B, the control signal (CS) is a wake-up (WU) signal, the control decision is a wake-up decision and the secondary transceiver modem is a wake-up modem (WU modem).

In accordance with the DRX, the first transceiver modem wakes up to read the physical downlink control channel (PDCCH) even in the case of no data allocation. This is illustrated in FIG. 7A with shaded sections 700. Additionally, the DRX may utilize inactivity timers to be awake for the subsequent data allocations even there are not any. This period is illustrated with a reference 704.

In the D-WuRx, the WU signal will be sent to the user node if it needs to wake up to receive an incoming message. If the WU modem receives the WU signal at 708 and detects the WU message, it sends a control signal to the first transceiver modem, for example, the baseband modem to switch the baseband modem on (as illustrated with a reference 702). The WU modem can receive WU signal from one to many Rx branches which can be used for reading the WU message from various user node Rx beams.

Reliable modem wake-up requires high sensitivity detection. In an embodiment, a fallback mechanism is used to normal DRX. In other works, the DRX cycle may be used together with D-WuRx. This increases the robustness of the solution.

The Y axis in FIGS. 7A and 7B illustrates the power consumption of the DRX and the D-WuRx and the X axis represents time. As can be clearly seen from FIG. 7A, in the DRX power is wasted at 702 as there are no packets to receive. A reference 706 indicating the time between two power on periods also indicates high latency in the DRX. A reference 710 indicating the D-WuRx cycle also indicates low latency of the D-WuRx.

When a network node has data in its transmission buffer and it wants a user node to wake up from a reduced power state, for example, a sleep state, it transmits to a user node code sequence using a resource block associated with the wake-up. The WU modem receives the incoming data symbols, filters the needed subcarriers ($N_{sc}$), detects the symbols (for example, with Fast Fourier Transform (FFT)), and correlates the symbol sequence $s_i(n)$ with the user node code sequence $c_i(n)$. If $s_i(n)T \cdot c_i(n) > $Wu_threshold, the WU modem sends a WU command to the baseband modem, and the WU command causes the baseband modem to be switched on. If the level of Wu_threshold is high, the probability of WU command decreases which correspondingly decreases the probability of receiving the data, and this causes extra latency. If the level of Wu_threshold is low, the probability for incorrect wake-up increases decreasing the power efficiency of the WU modem.

Figure 8A:
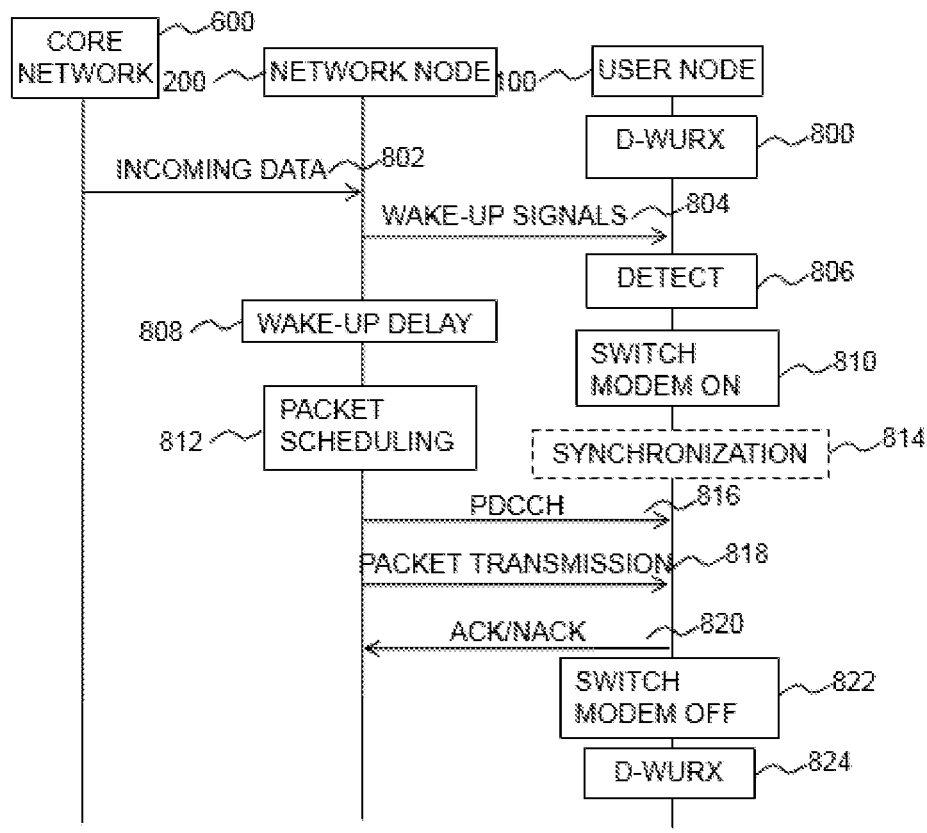
FIG. 8A illustrates a flowchart illustrating signaling relating to wake-up initiated packet scheduling.
Figure 8B:
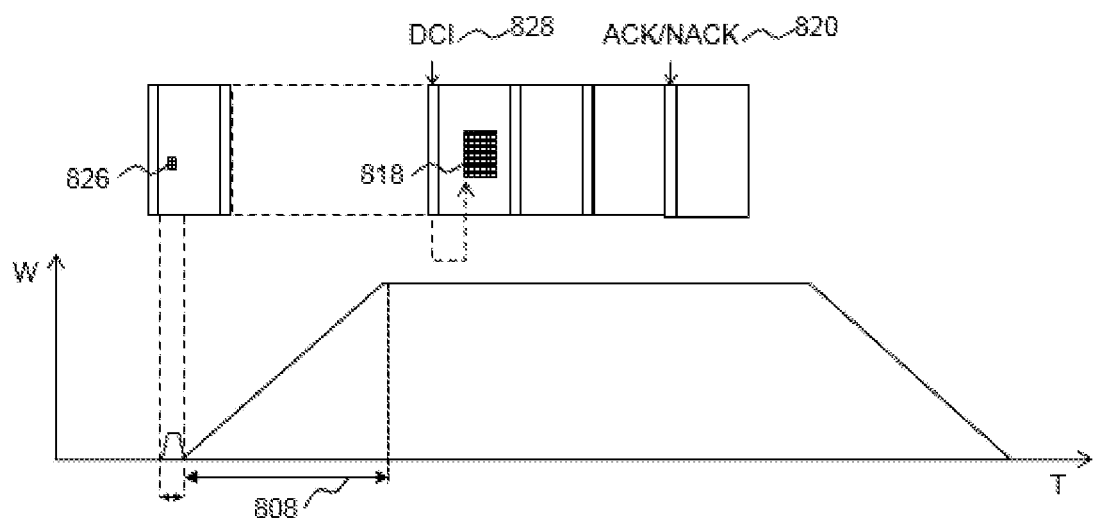
FIG. 8B illustrates a chart illustrating switching a first transceiver modem on after receiving a wake-up message.

FIG. 8A illustrates a flowchart illustrating signaling relating to wake-up initiated packet scheduling. FIG. 8B illustrates a chart illustrating switching the first transceiver modem 106 on after receiving a wake-up message. For simplicity and clarity, FIGS. 8A and 8B are discussed together.

In this example, the user node 100 comprises a first transceiver modem that is a baseband modem and a secondary transceiver modem that is a wake-up modem (WU modem). It is also assumed here that the user node 100 is in the discontinuous Wu-Rx (D-WuRx) mode where the WU modem is switched on/off following a predefined duty cycle.

When the network node 200 receives an incoming packet 802 from the core network 600 or it has control data to be sent, the network node 200 sends a wake-up (WU) signal 804 or starts sending WU signals 804 to the user node 100.

Reference 808 (a wake-up delay) refers to a time delay that is needed for the user node 100 to detect, receive and switch the baseband modem on. After the wake-up delay, the network node 200 may start scheduling packets 812 for the user node 100.

After detecting 806 and receiving a WU message 826 from the network node 200, the WU modem of the user node 100 sends a WU command 810 to the baseband modem and the baseband modem starts to ramp-up itself. In the case the baseband modem is not synchronized it needs to receive the symbol level and frame level synchronization 814 after which it can read downlink channel information (DCI) 828 from the physical downlink control channel (PDCCH) 816 or equivalent. From the DCI the baseband can read the exact location(s) of the incoming data allocation(s) 818.

After processing the data, the baseband modem may send to the network node 200 an uplink response, for example, an ACK/a NACK 820 corresponding to the received data in order to indicate data reception. After sending the ACK/NACK, the baseband modem goes 822 back to sleep.

In an embodiment, the user node 100 may send uplink feedback with uplink control signaling utilizing the WU modem. If the wake-up signal is correctly received, the baseband modem is switched on and the user node 100 sends uplink tracking signals with the WU modem. With this information the network node 200 knows that the WU signal has been received and that the baseband modem is switched on for subsequent packet transmissions. If the WU signal is missed, no positive indication is sent. If the indication is not received by the network node 200, the network node 200 may increase the relative transmission power of the WU signal and transmits the WU signal again in the next D-WuRx cycle. The WU modem may cumulatively sum subsequent WU signals and utilize this sum for detection. Before the retransmission a load control may checks if there are resources available. If there are no resources available or if the maximum number of retransmissions is exceeded, the D-WuRx will go to normal DRX.

Figure 9:
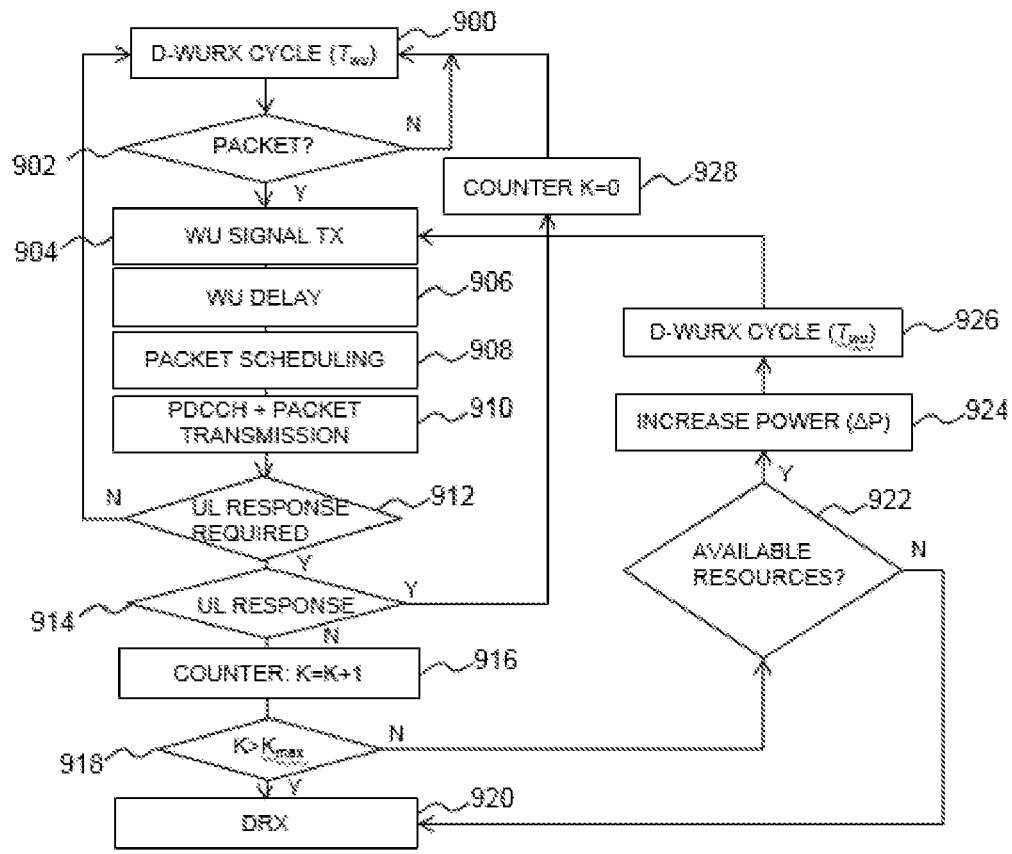
FIG. 9 illustrates a flowchart illustrating discontinuous WuRx including a fallback to discontinuous reception.

FIG. 9 illustrates a flowchart illustrating discontinuous WuRx including a fallback to discontinuous reception. In this example, the user node 100 comprises a first transceiver modem that is a baseband modem and a secondary transceiver modem that is a wake-up modem (WU modem). It is also assumed here that the user node 100 is in the discontinuous Wu-Rx (D-WuRx) mode where the WU modem is switched on/off following a predefined duty cycle ($T_{wu}$) 900.

At 902 it is determined whether a packet including a signal in the subset of resource elements is received. If not, the processing returns back to block 900. If it is determined at 902 that the signal has been received, a type of the signal is determined at 904. A block 906 represents the delay when the WU modem sends a wake-up command to the first transceiver modem and the first transceiver modem starts to ramp-up itself. At blocks 908 and 910, the first transceiver modem reads the downlink channel information (DCI) from the physical downlink control channel (PDCCH) and receives the actual packet data.

At 912 it is determined whether an uplink response needs to be sent. If no response is required, the processing returns back to the block 902. If the uplink response is received at 914, at 928 a counter K is reset and the processing returns back to the block 900. The counter K represents the number of retransmissions of the wake-up signal.

If at 914 no uplink response is received, at 916 the value of the counter K is increased by one. If the value of the counter K is not greater than a predetermined maximum counter K value $K_{max}$, the processing proceeds to a block 922. At 922, a load control checks if there are resources available. If there are no resources available at 922, the processing returns back to a normal discontinuous reception (DRX) operation block 920. Similarly, if the maximum number of retransmissions is exceeded at 918, the processing returns back to the normal DRX operation block 920. If there are resources available at 922, the network has two methods to increase the detection probability of the WU signal in the case of receiving no uplink response: (1) increasing power, as illustrated by a block 924, and (2) increasing the sending repetition, as illustrated by a block 926. If there are many users using exactly the same WU resources, it may be possible at 924 to increase the power of one user node with the cost of power of the other user nodes, and by doing that increasing the detection probability of this particular user node. If there is only one user node, transmission repetition may be increased at 926. After the retransmission, the processing returns back to the block 904.

On the other hand, it may be that a user node is in a very bad location and is not able to react to the wake-up signal but can still hear normal signals, like pilot and synchronization signals. Therefore, the user node may be moved at 922 to normal DRX 920 where reception with the first transceiver modem is applied.

Figure 10:
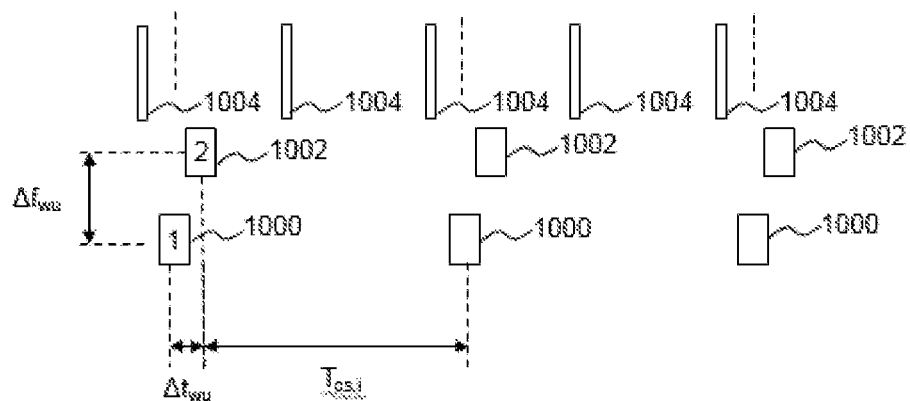
FIG. 10 illustrates time and frequency repeated versions of control resources.

FIG. 10 illustrates time and frequency repeated versions of control resources. The sensitivity of a control signal (CS) can be improved by repeating the signal with K frequency or/and time shifted versions. In the example illustrated in FIG. 10, each control signal is repeated once and the repeated signal is both frequency and time shifted. The shifting increases the diversity mainly against fast fading which decreases the control signal quality. $T_{cs,i}$ denotes a subset period for a user node i. A reference 1004 denotes a main synchronization signal.

In the case of frequency only shifted versions ($\Delta t_{wu}=0$) of the control signal, the secondary transceiver modem 106 can read all the diversity versions of the signal at the same time which does not increase the duty cycle of the secondary transceiver modem 106.

If there is time shifting ($\Delta t_{wu} \neq 0$), the secondary transceiver modem 106 might need to be awake for a longer period which increases the duty cycle and the power consumption.

The values of the $\Delta t_{wu}$ and $\Delta f_{wu}$ are dependent on the radio channel and the mobility which are user node dependent. Therefore, the control signal may be allocated to one or several resource blocks depending on its channel characteristics. The network node 200 may allocate the control signal resources of each user node 100 based on the channel information, reported signal quality information or other parameters.

Figure 11:
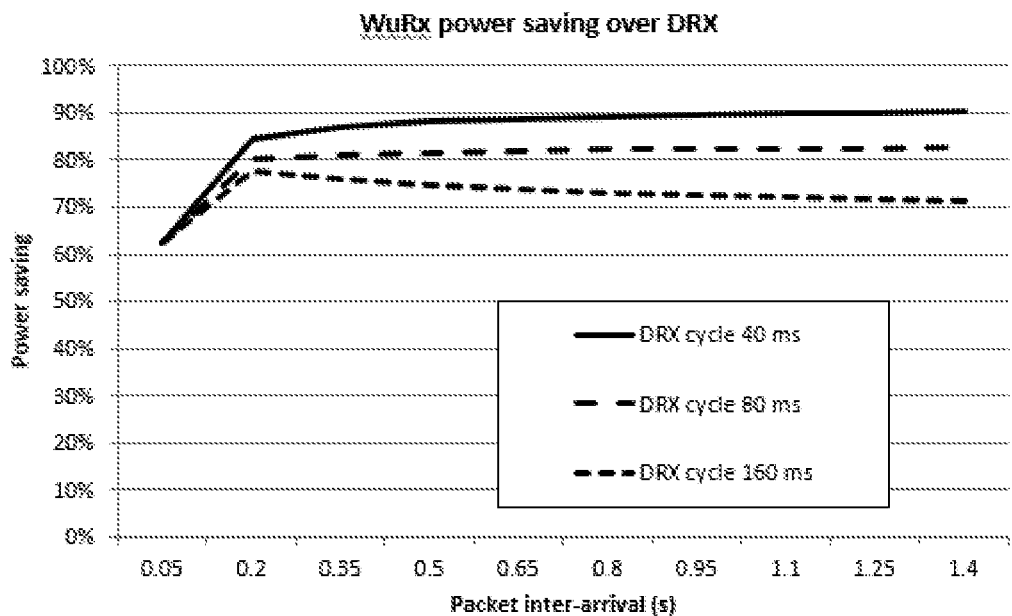
FIG. 11 illustrates power saving of WuRx compared to a normal Discontinuous Reception solution as a function of packet inter-arrival time.

FIG. 11 illustrates power saving of WuRx compared to a normal discontinuous reception solution as a function of packet inter-arrival time. More specifically, FIG. 11 shows the WuRx power saving over normal DRX as a percentage as a function of packet inter-arrival time. For example, it can be seen that with >1s inter-arrival rate and with 40 ms DRX 90% improvement in power consumption can be achieved. The various parameters used in the calculation are illustrated in Table 1.

TABLE 1

| | |
|---|---|
| DRX ON time | 10 ms |
| DRX Inactivity timer | 100 ms |
| RF-IC PC | 100 mW |
| Baseband modem PC | 233.3 mW |
| Baseband modem WU/WD time | 10 ms/5 ms |
| Sleep power | 1 mW |
| WuRx PC | 13.3 mW |
| WuRx cycle | 5 ms |
| WuRx ON time | 0.5 ms |

Figure 12:
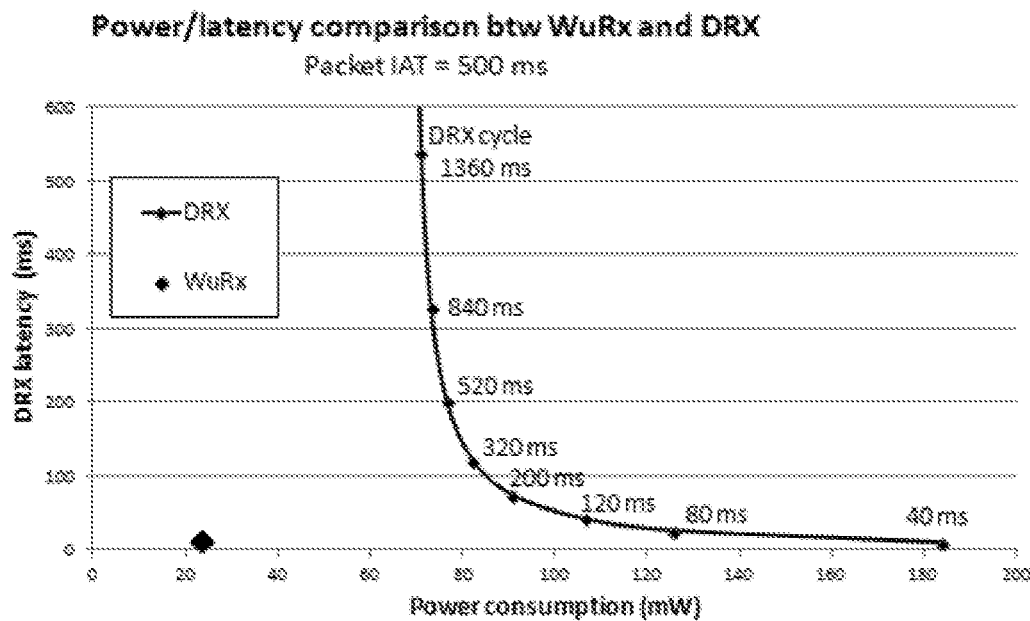
FIG. 12 illustrates power consumption versus of Discontinuous Reception latency in the case of normal Discontinuous Reception and Wu-Rx with 500 ms packet inter-arrival time.

FIG. 12 illustrates power consumption versus of discontinuous reception latency in the case of normal discontinuous reception and WuRx with 500 ms packet inter-arrival time. With the normal DRX both the power consumption and the latency changes as the DRX cycle changes, as can be seen from the results. In WuRx the baseband modem is activated only when the data will be scheduled and therefore energy is wasted for useless modem activity for PDCCH detection. As can be seen from FIG. 12, in WuRx the latency is negligible and the power consumption is only a fraction of the power consumption with the DRX.

Figure 13A:
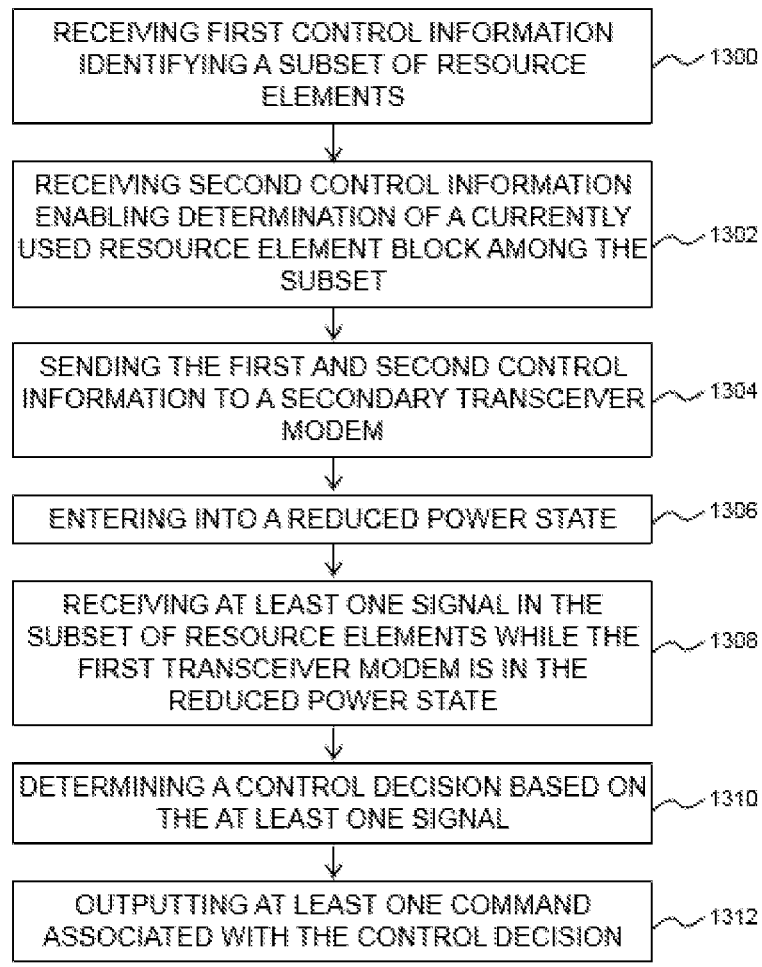
FIG. 13A illustrates a flowchart showing a method performed by a user node.

FIG. 13A illustrates a flowchart showing a method performed by a user node according to an aspect. The method may be applied by a user node comprising a first transceiver modem and a secondary transceiver modem, where the secondary transceiver modem is configured to make a control decision while the first transceiver modem is in a reduced power state.

At 1300, first control information identifying a subset of the resource elements among a full set of the resource elements is received by a first transceiver modem.

At 1302 second control information enabling determination of a currently used resource element block among the subset of the resource elements is received by the first transceiver modem.

At 1304 the first control information and the second control information are sent by the first transceiver modem to a secondary transceiver modem.

At 1306 a reduced power state is entered with the first transceiver modem.

At 1308, based on the first control information and the second control information, a signal in the subset of the resource element blocks receiving is received by the secondary transceiver modem while the first transceiver modem is in the reduced power state.

At 1310 a control decision is determined by the secondary transceiver modem based on the signal.

At 1312 a command associated with the control decision is output by the secondary transceiver modem.

Figure 13B:
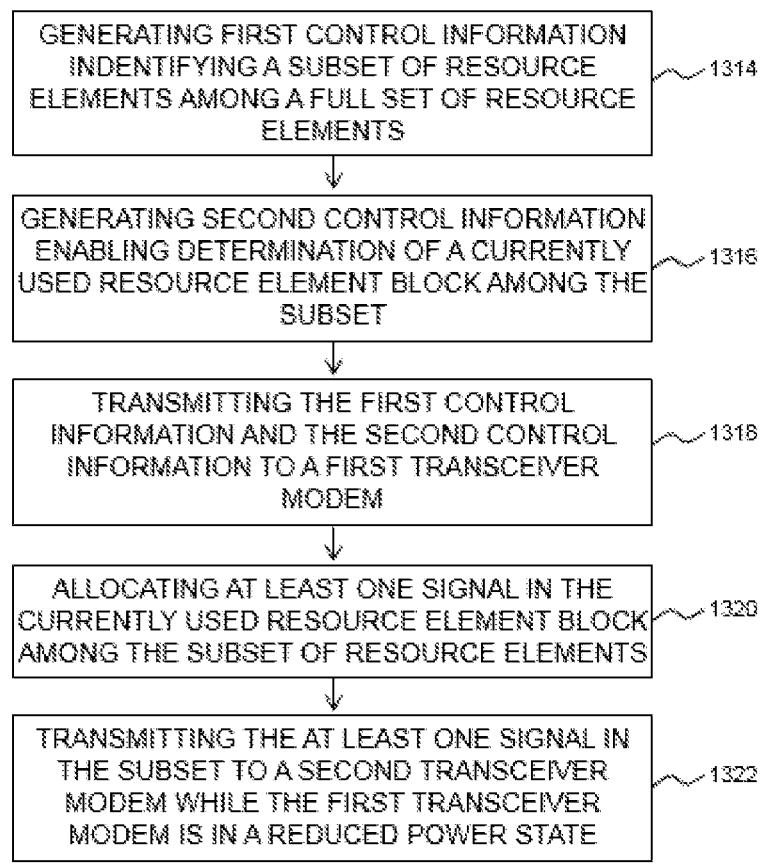
FIG. 13B illustrates a flowchart showing a method performed by a network node.

FIG. 13B illustrates a flowchart showing a method performed by a network node according to an aspect. The method may be applied by a network node, and the network node is communicatively connected to a user node comprising a first transceiver modem and a secondary transceiver modem.

At 1314 first control information identifying a subset of resource elements among a full set of resource elements is generated by a processing unit.

At 1316 second control information enabling determination of a currently used resource element block among the subset of resource elements is generated by the processing unit.

At 1318 the first control information and the second control information are transmitted by a transceiver to a first transceiver modem 104 of a user node.

At 1320 a signal is allocated allocating by the processing unit in the currently used resource element block among the subset of resource elements.

At 1322 the signal is transmitted by the transceiver in the subset of resource elements to a secondary transceiver modem of the user node while the first transceiver modem is in a reduced power state.

The functionality described herein can be performed, at least in part, by one or more computer program product components such as software components. According to an embodiment, the user node and/or network node comprise a processor configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include field-programmable gate arrays (FPGAs), program-specific integrated circuits (ASICs), program-specific standard products (ASSPs), system-on-a-chip systems (SOCs), complex programmable logic devices (CPLDs), graphics processing units (GPUs).

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A user node comprising:
   a processor;
   a first modem capable of receiving a full set of resource elements;
   a second modem capable of receiving a subset of resource elements among the full set of resource elements, the subset of resource elements comprising resource element blocks;
   the first modem configured to cooperate with the processor to provide at least the following operations:
      receiving first control information identifying the subset of the resource elements and second control information enabling determination of a currently used resource element block among the subset of resource elements;
      sending the first control information and the second control information to the second modem; and
      entering into a reduced power state;
   the second modem configured to cooperate with the processor to provide at least the following operations:
      receiving, based on the first control information and the second control information, at least one signal in the subset of resource elements while the first modem is in the reduced power state;
      determining a control decision based on the at least one signal; and
      outputting at least one command associated with the control decision.

2. The user node of claim 1, wherein the at least one command comprises a wake-up command and the second modem is further configured to send the wake-up command to the first modem to wake up the first modem from the reduced power state.

3. The user node of claim 1, wherein the second modem is further configured to send the at least one command to at least one of a radio frequency receiver, a front-end module, a radio frequency transmitter, or a radio frequency integrated circuit unit of the user node.

4. The user node of claim 3, wherein the at least one command comprises a command for the radio frequency receiver to change a discontinuous reception cycle of the first modem.

5. The user node of claim 3, wherein the at least one command comprises a power up/down command for the front-end module to increase or decrease the transmission power.

6. The user node of claim 3, wherein the at least one command comprises an uplink tracking signal command causing the radio frequency transmitter to transmit an uplink tracking signal.

7. The user node of claim 3, wherein the at least one command comprises a feedback channel command causing the radio frequency transmitter to provide a feedback channel for a wake-up signal.

8. The user node of claim 3, wherein the radio frequency integrated circuit unit comprises a millimeter band receiver, wherein the second modem is further configured to send the command to control the millimeter band receiver.

9. A network node for a wireless communication system comprising:
   a processor configured to
      generate first control information identifying a subset of resource elements among a full set of resource elements; and
      generate second control information enabling determination of a currently used resource element block among the subset of resource elements;
   a transmitter configured to cooperate with the processor to transmit the first control information and the second control information to a first modem of a user node;
   the processor further configured to allocate at least one signal in the currently used resource element block among the subset of resource elements; and
   the transmitter further configured to cooperate with the processor to transmit the at least one signal in the subset of resource elements to a second modem of the user node while the first modem is in a reduced power state.

10. The network node of claim 9, wherein the at least one signal is associated with a wake-up command to wake up the first modem from the reduced power state.

11. The network node of claim 9, wherein the at least one signal comprises a signal for at least one of a radio frequency receiver, a front-end module, a radio frequency transmitter, or a radio frequency integrated circuit unit of the user node to enable control of the signaled entity while the first modem is in the reduced power state.

12. The network node of claim 9, wherein the processor is further configured to allocate a common code sequence for a group of user nodes for the transmission of the at least one signal.

13. The network node of claim 9, wherein the processor is further configured to allocate the same time, frequency and code resources for resource element blocks in different antenna beams.

14. A method comprising:
   receiving, by a first modem, first control information identifying a subset of resource elements among a full set of the resource elements;
   receiving, by the first modem, second control information enabling determination of a currently used resource element block among the subset of resource elements;
   sending, by the first modem, the first control information and the second control information to a second modem;
   entering into a reduced power state with the first modem;
   receiving, by the second modem, based on the first control information and the second control information, at least one signal in the subset of the resource element blocks while the first modem is in the reduced power state;
   determining, by the second modem, a control decision based on the at least one signal; and
   outputting, by the second modem, at least one command associated with the control decision.

15. The method of claim 14, wherein the at least one command comprises a wake-up command, and wherein the method includes, sending, by the second modem, the wake-up command to the first modem to wake up the first transceiver modem from the reduced power state.

16. The method of claim 14, including sending, by the second modem, the at least one command to at least one of a radio frequency receiver, a front-end module, a radio frequency transmitter, or a radio frequency integrated circuit unit of a user node.

17. The method of claim 16, wherein the at least one command comprises a command for the radio frequency receiver to change a discontinuous reception cycle of the first modem.

18. The method of claim 16, wherein the at least one command comprises a power up/down command for the front-end module to increase or decrease the transmission power.

19. The method of claim 16, wherein the at least one command comprises an uplink tracking signal command causing the radio frequency transmitter to transmit an uplink tracking signal.

20. The method of claim 16, wherein the at least one command comprises a feedback channel command causing the radio frequency transmitter to provide a feedback channel for a wake-up signal.

* * * * *